(12) United States Patent
Holtkamp

(10) Patent No.: US 8,562,066 B2
(45) Date of Patent: Oct. 22, 2013

(54) CAMPING VEHICLE COMPRISING A TENT CONSTRUCTION THAT CAN BE FOLDED OUT

(76) Inventor: Egbert Berend Holtkamp, Ter Apel (NL)

(*) Notice: Subject to any disclaimer, the term of this patent is extended or adjusted under 35 U.S.C. 154(b) by 85 days.

(21) Appl. No.: 13/002,307

(22) PCT Filed: Jun. 24, 2009

(86) PCT No.: PCT/IB2009/006601
§ 371 (c)(1),
(2), (4) Date: Mar. 5, 2011

(87) PCT Pub. No.: WO2010/001259
PCT Pub. Date: Jan. 7, 2010

(65) Prior Publication Data
US 2011/0260498 A1    Oct. 27, 2011

(30) Foreign Application Priority Data
Jul. 1, 2008  (NL) .................................. 2001737

(51) Int. Cl.
*B60P 3/355* (2006.01)
(52) U.S. Cl.
USPC ......... 296/156; 296/169; 296/173; 296/26.02
(58) Field of Classification Search
USPC .................. 296/156, 164, 168, 26.01, 26.04, 296/26.06–26.09, 26.11–26.15, 165, 172, 296/173, 175, 169, 26.02
See application file for complete search history.

(56) References Cited

U.S. PATENT DOCUMENTS

| | | | |
|---|---|---|---|
| 3,393,479 A | | 7/1968 | Slotnick |
| 4,093,302 A | * | 6/1978 | Adams .......................... 296/156 |
| 4,113,301 A | * | 9/1978 | Olmstead ...................... 296/169 |
| 4,296,960 A | * | 10/1981 | Winchester ................... 296/167 |
| 4,754,998 A | * | 7/1988 | LeJuerrne ..................... 296/173 |

(Continued)

FOREIGN PATENT DOCUMENTS

| | | |
|---|---|---|
| DE | 4008851 A1 | 9/1991 |
| EP | 1232908 A1 | 8/2002 |

(Continued)

*Primary Examiner* — Glenn Dayoan
*Assistant Examiner* — Gregory Blankenship
(74) *Attorney, Agent, or Firm* — Gudrun E. Huckett

(57) ABSTRACT

The invention relates to a camping vehicle (150) comprising at least one vehicle wall (155), a tent construction (101) that can be folded out and has at least one individual tent wall (102), which can be converted from a stored state into an erected state and a frame construction (103). The vehicle wall or walls (155) and the tent wall or walls (102), in a design in which they adjoin one another, together form part of a delimiting wall construction, which when erected defines at least one single internal habitable area of the camping vehicle. The delimiting wall construction is provided with an inflation connection (104) and closing means (105, 106) that close respective openings (107, 117) for the habitable area or areas. According to the invention, the delimiting wall construction is designed in such a way that it can be inflated with the closing means closed from the stored state into an inflation state that temporarily occurs during the erection of the tent construction. The frame structure is designed in such a way that it is converted at least partially into its operating state during the inflation procedure and once the inflation procedure has been completed, said erected state is maintained at least temporarily upright.

7 Claims, 3 Drawing Sheets

(56) References Cited

U.S. PATENT DOCUMENTS

| | | | |
|---|---|---|---|
| 5,080,426 A * | 1/1992 | Johnson | 296/161 |
| 5,419,607 A * | 5/1995 | Oliveira | 296/159 |
| 5,462,330 A * | 10/1995 | Brown | 296/172 |
| 5,692,795 A * | 12/1997 | Mininger | 296/164 |
| 5,983,576 A * | 11/1999 | Hanser et al. | 52/67 |
| 5,987,822 A * | 11/1999 | McNiff et al. | 52/2.11 |
| 6,179,367 B1 | 1/2001 | Bowen | |
| 6,263,617 B1 * | 7/2001 | Turcot et al. | 52/2.18 |
| 6,810,896 B2 * | 11/2004 | Ueda et al. | 135/136 |
| 7,178,857 B2 * | 2/2007 | Williams | 296/173 |
| 2010/0230999 A1 * | 9/2010 | Setzer | 296/173 |
| 2011/0260498 A1 * | 10/2011 | Holtkamp | 296/161 |

FOREIGN PATENT DOCUMENTS

| | | |
|---|---|---|
| EP | 1243723 A1 | 9/2002 |
| NL | 1004052 A1 | 3/1998 |
| WO | 03/006765 A1 | 1/2003 |

\* cited by examiner

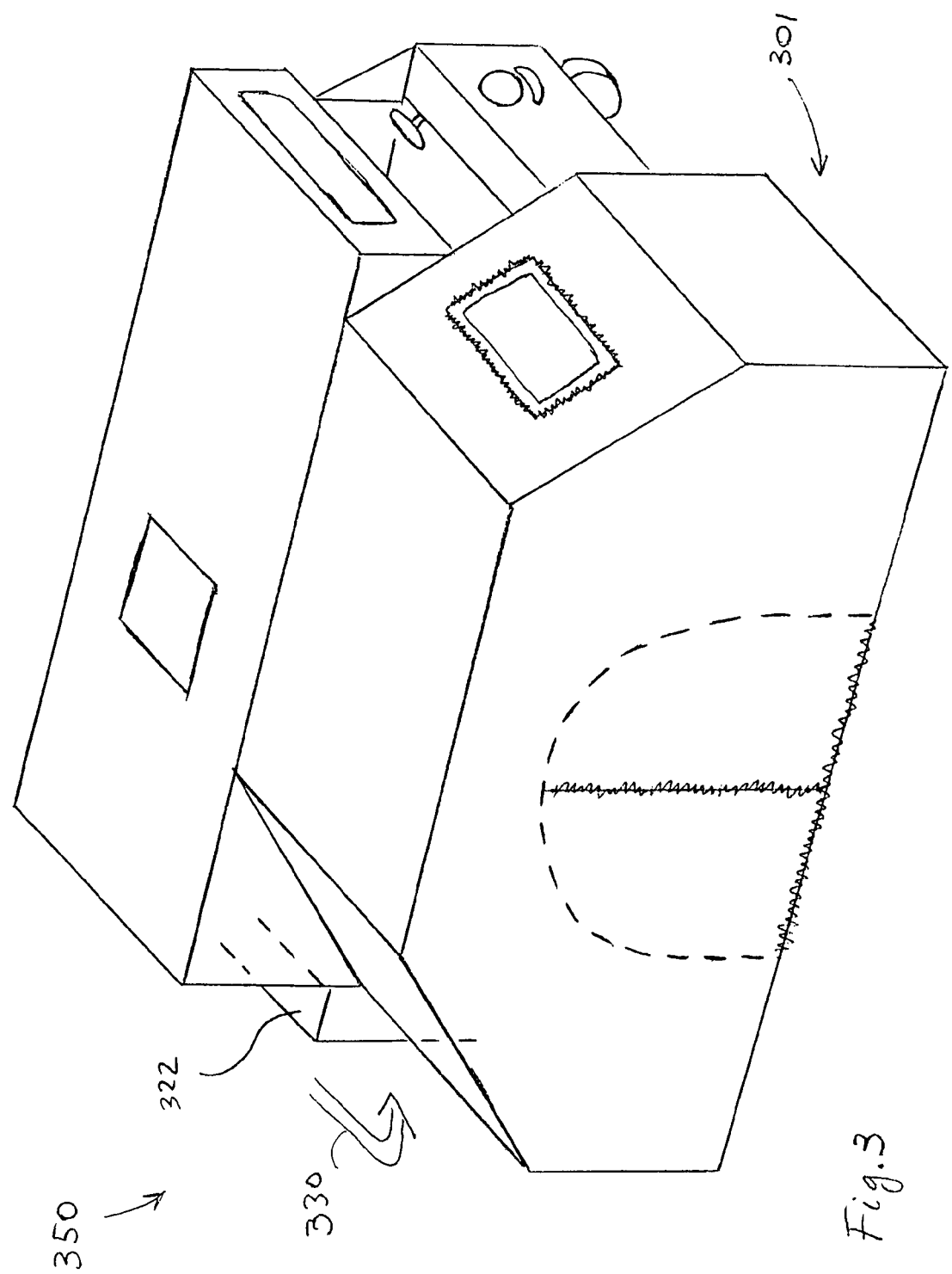

CAMPING VEHICLE COMPRISING A TENT CONSTRUCTION THAT CAN BE FOLDED OUT

BACKGROUND OF THE INVENTION

The invention concerns a camping vehicle, such as an automobile or a trailer for leisure time activity, that comprises at least one vehicle wall; a fold-out tent construction comprising at least one tent wall that, upon erection of the tent construction from a stowed-away state that is provided by the at least one vehicle wall and in which the tent construction is folded down, can be moved into an erected state in which the tent construction is folded out; and a frame structure for maintaining the erected state of the folded-out tent construction. The at least one vehicle wall and the at least one tent wall adjoin each other in such a way or are joinable to each other such that they, in an adjoined state, form together a part of a boundary wall construction that, in the erected state, defines at least one interior living space of the camping vehicle wherein at least a part of the at least one vehicle wall as well as at least a part of the at least one tent wall each immediately delimit the at least one interior living space.

A camping vehicle of the aforementioned kind has a fold-out tent construction that is integrated into the camping vehicle.

A similar camping vehicle that is widely used in practice is, for example, a so-called "folding caravan", i.e., a trailer that has a fold-out tent construction. Such a folding caravan is also referred to as "tent trailer" or, for short, pop-up camper. In the folded-down state of the tent construction the cargo space in the cargo area of the folding caravan serves as storage space for parts of the folded-down tent construction. In the fold-out state of the tent construction, the cargo space may be part of the interior living space of the tent construction.

Instead of a trailer, such a camping vehicle provided with a fold-out tent construction can also be in the form of an automobile. In this case, the camping vehicle is referred to generally as a "motorhome" or also "camper". In such a motorhome with integrated tent construction the tent construction in the stowed-away state may be, for example, housed in a container at the rear wall, the side, or the top of the motorhome.

Such camping vehicles with an integrated tent construction are provided for leisure time activities. For example, during vacation the tent construction is frequently folded out and erected or folded down and stowed. Users who choose such an integrated transportation means that combines transport and dwelling possibilities often visit a different vacation site every day.

Even at a set dwelling location of the camping vehicle, the tent construction is frequently folded out or folded down. For example, users do not want to fold down and stow away a tent construction that is wet because of precipitation. In order to avoid this, in anticipation of an expected shower, the tent construction is often briefly stowed only during the shower in order to then unfold and erect the tent construction again after the shower. When because of a required departure that cannot be delayed, the tent construction must be folded down anyway while wet, the users will then briefly erect the tent construction again at a later suitable point in time only to have the opportunity to allow the tent construction to dry. After drying, the tent construction is then again stowed away.

Because of the frequent fold-out and fold-down of the tent construction, users often have the desire that at least the fold-out action but also the fold-down action may be carried out with optimal ease of use.

In case of the known camping vehicles with an integrated tent construction such ease of use is still lacking to a great extent.

When folding out as well as folding down, the users must know or must find out where and in which way the frame structure, in the form of, for example, rods, tent poles, but also tent cords, tent stakes, tent pegs, or the like, must be erected or returned into its stow-away state. In this connection, frequently a user must move underneath a drooping tent fabric, crawling and searching on his hands and knees, while he should keep the tent fabric in a raised position at the same time. All this requires several manipulations, often done by several persons, wherein the tent fabric must be pulled and stretched at different locations. When the tent construction, for example, is provided with a bottom sheet, this sheet, when unfolding it, is not positioned properly, often as a result of the difficult tasks of the users, so that the bottom sheet is positioned askew and undesirable folds are formed. The tent construction, in particular the bottom sheet, is often wet and/or soiled so that the user often will end up with dirty body parts and dirty clothing. Also, the frame structure is often improperly erected. Users may be injured by parts of the frame structure.

The required efforts and the obtained final result of erection as well as of stowing of the tent construction in known camping vehicles with an integrated tent construction depend greatly on the skill, the experience, the number and physical possibilities of the users in question. In case of single, smaller, older, weaker or bodily impaired users, choosing such a camping vehicle often is not an option.

It is an object of the present invention to provide, for avoiding the aforementioned disadvantages, a tent construction of a camping vehicle of the aforementioned kind mentioned in the beginning that is at least easier to erect.

SUMMARY OF THE INVENTION

According to the invention, the invention provides a camping vehicle wherein the boundary wall construction is provided with at least one inflation connector for inflation means and comprises closure means with which all openings, such as window and/or door and/or venting openings, forming a component of the boundary construction are closable relative to the at least one interior living space. The boundary wall construction is configured to be inflatable, in the closed state of the closure means, beginning with the stowed-away state, by means of the inflation means into an inflated state that exists temporarily during erection of the tent construction and, in this state, the tent construction is folded out at least partially in that the inflation means effect an overpressure in the interior living space. The frame structure that during the inflation process at least partially has been moved into the operative state is configured such that, after termination of the inflated state, the achieved erected state can be maintained without the overpressure in the interior living space.

Inflation can be done, for example, by means of inflating air that is supplied by a compressor and/or by means of an air pump. By this inflation the tent construction in a simple way will be transferred from the stowed state into the temporarily occurring inflated state. In this inflated state, the tent construction, partially or entirely automatically, is already in the erected state. The user requires therefore no knowledge or must not find out how the tent construction must be folded out. Thus, the tent construction can be erected automatically, i.e., "by the push of a button".

The frame structure may comprise, for example, rods, tent poles, but also tent cords, tent stakes, tent pegs or the like. The action of generating the operative state of the frame structure, which partially occurs already during the temporary inflation state, can be achieved, for example, by the user. Since the tent construction is then in the inflated state, the user must not lift this construction, like a tent fabric or the like, in order to arrange and secure the tent poles, rods or the like. Also, the user will quickly recognize how and where the parts of the frame structure are to be arranged on the folded-out boundary wall construction, respectively, how the parts are to be secured.

However, the frame structure during the inflated state may be brought, for example, completely automatically or partially automatically, at least partially into an operative state. For example, the frame structure, entirely or partially pre-manufactured, can be connected to the fold-out tent construction and during inflation can be folded out automatically, simultaneously with fold-out of the tent construction, into a position in which the frame structure secures the folded-out tent construction for maintaining the erect state.

Canceling the inflated state can be realized, for example, at the moment when the frame structure during inflation has been transferred at least partially (completely automatically or partially automatically) into an operative state such that the tent construction from this moment on can be transferred in a simple way into its erected state. Inasmuch as this has not occurred automatically, the user, for example, during inflation may have arranged or secured a number of rods, tent poles or tent cords etc. so that the tent construction when canceling the inflated state will not automatically collapse again.

A significant advantage of the camping vehicle according to the present invention provides moreover that the disclosed basic principle may be used also in reverse, i.e., for stowing away an erected tent construction. In this case, for example, the door, window and venting openings can be closed, suction means can be connected to the inflation connector, frame elements can be removed and/or released and the suction means for suctioning the interior living space and also for automatic folding down of the tent construction can be activated. An additional advantage resides in that the tent construction, in comparison to manual stowing away of the tent construction, can be completely emptied by suction so that thus in a simple way it is achieved that the tent construction in the stowed-away state is extremely compact, similar to a vacuum-sealed product.

Commercially available are devices that are selectively adjustable in order to operate as an inflation device or as a suctioning device so that the tent construction can be automatically erected as well as automatically stowed away by means of a single device. In this connection, the inflation connector can function selectively as a suctioning connector. The inflation device can be, for example, designed to function also as a suctioning device by reversal of the air stream. Optionally, in addition to an inflation device also a separate and similar suctioning device can be provided. In the latter case, for example, suction means can be connected to the suction connector and inflation means can be connected to the inflation connector or suction/inflation means integrated in a single device can be connected to both connectors.

BRIEF DESCRIPTION OF THE DRAWINGS

Specific configurations of the invention are set forth in the dependent claims.

In the following, the invention is explained with reference to the principle illustrations of the attached drawing in more detail.

FIG. 3 shows in a perspective illustration an embodiment of a motorhome according to the invention.

DESCRIPTION OF PREFERRED
EMBODIMENTS

Figure 1:
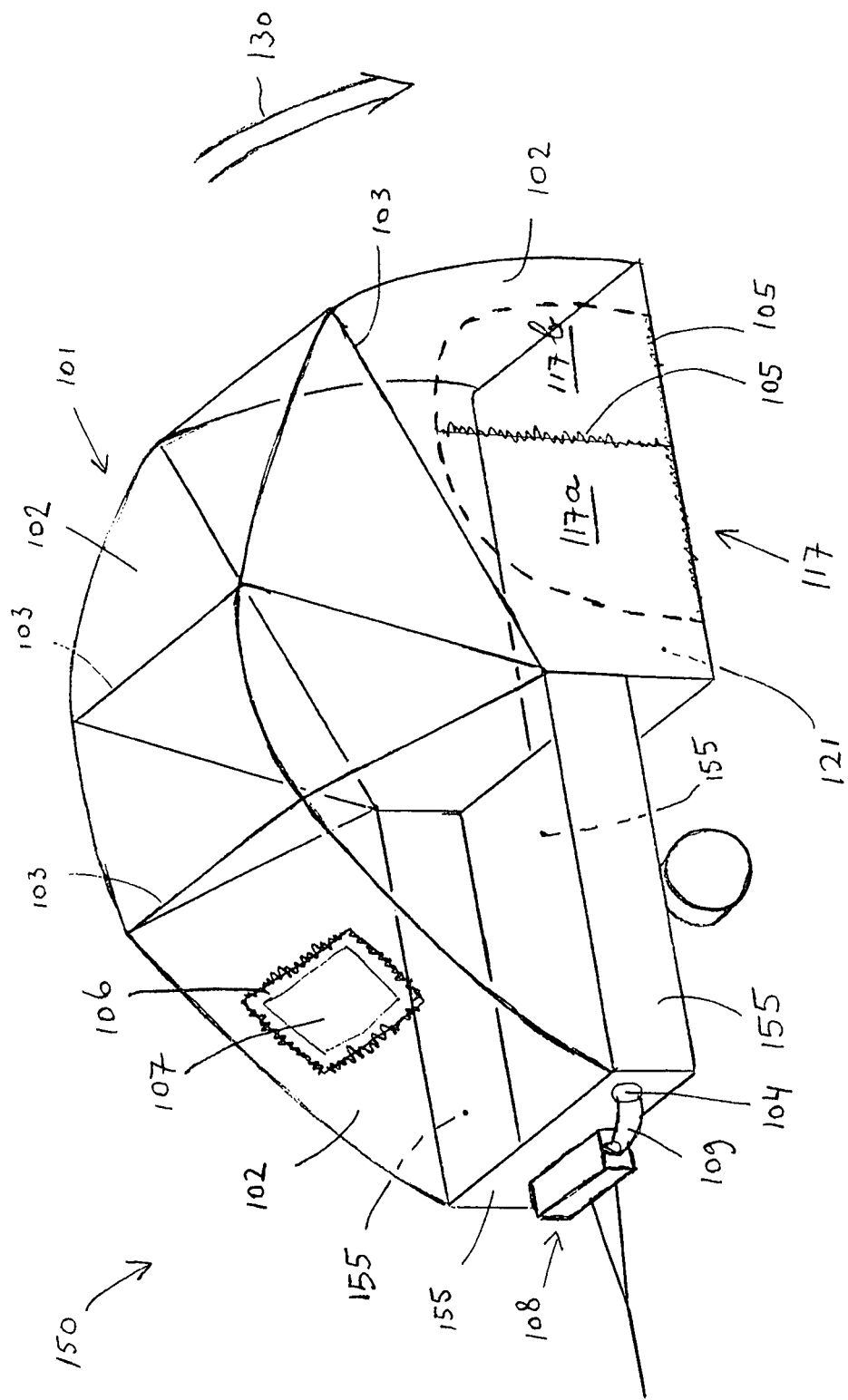
FIG. 1 shows in perspective illustration an example of a configuration of a folding caravan according to the invention.

First, reference is being had to FIG. 1 in which an example of an embodiment of a folding caravan 150 according to the invention is shown. The folding caravan 150 comprises a cargo area formed by bottom and side walls 155. The folding caravan 150 comprises moreover a fold-out tent construction 101 that comprises a plurality of tent walls 102 adjoining the cargo area walls 155. In FIG. 1, the tent construction 1 is illustrated in the erected state in which the tent construction is folded out. In the stowed-away state (not shown) of the tent construction the cargo space in the cargo area of the folding caravan serves as storage space for parts of the folded-down tent construction.

The cargo area walls 155 and the tent walls 102 adjoin each other in such a way that together they form a part of a boundary wall construction that in the erected state defines an interior living space of the camping vehicle 150 wherein the cargo area walls 155 as well as the tent walls 102 delimit the living space immediately. In the illustrated fold-out state of the tent construction the cargo space of the cargo area is part of the interior living space of the folding caravan.

In FIG. 1 reference numeral 103 indicates a number of stiff U-shaped frame elements of the frame structure of the tent construction 101. The tent walls 102 can be comprised, for example, mainly of fabric connected to the frame elements 103. In the embodiment the frame elements 103 are attached, in a way that is conventional for folding caravans, pivotably at the cargo area so that the tent construction 101 can be folded out in the direction indicated by arrow 130 in order to reach the illustrated erected state. From the erected state the tent construction 101 can be folded down in opposite direction of the arrow 130 in order to assume the stowed-away state. In the stowed-away state the cargo area of the folding caravan serves as a storage space of the frame elements 103 and the tent walls 102.

The part of the tent walls 102 indicated by reference numerals 121 may be, for example, manufactured of canvas that, on the one hand, is suitable for use as a bottom sheet of the tent construction in the erected state and, on the other hand, for use as a cover sheet of the trailer in the stowed-away state. The part 121 may also be made, for example, from a stiff panel material in order to form a hart bottom or hardcover.

In the illustrated embodiment, the tent walls 102 are provided with a window opening 107 and a door opening 117. These openings in the respective wall 102 are, for example, closable by door or window covers, zippers, hook-and-loop fasteners or the like. Also, the boundary wall construction can be provided with one or several closable venting openings. According to the invention, the boundary wall construction is provided with closure means in order to close all window, door, and venting openings of the boundary wall construction. In the illustrated embodiment, the door opening 117 is provided with door flaps 117a, 117b and a zipper and the door opening 107 is closable with a window cover 106 provided with a zipper.

Moreover, the boundary wall construction is provided with an inflation connector 104 for inflation means 108. The inflation means can be, for example, an air compressor or an air pump. In the example, a conduit 109 for such inflation means 108 is illustrated so that through this conduit the inflation air can be supplied. The connector 104 is located in a sidewall 155 of the cargo area but can also be located in another wall of the boundary wall construction, for example, in the bottom wall of the cargo area.

It should be noted that in the context of the invention the inflation connector may also be integrated more or less into the inflation means. For example, the inflation means can be connected selectively (semi) permanently with the boundary wall construction or at least partially be a component of the boundary wall construction in such a way that the inflation connector is formed by the inflation outlet of the inflation means.

The illustrated boundary wall construction 102, 155 is designed such that they—with the closure means 105, 106 in the closed state—are inflatable, beginning with the stowed-away state, by means of the inflation means 108 into a temporarily occurring inflation state that occurs during erection of the tent construction 101. In the inflated state the tent construction 101 is at least partially folded out in that by the inflation means 108 an overpressure is effected in the interior living space. This form of inflatability implies the presence of the aforementioned closure means and an interior living space that is completely enveloped by the boundary wall construction 102, 155. When, for example, in the embodiment according to FIG. 1 the window cover 106 were not present or the bottom sheet 121 were missing, the tent construction would not be inflatable in the aforementioned sense because of leakage of the inflation air. This form of inflatability however does not mean that the walls of the boundary wall construction must be produced of a completely air-impermeable material. A minimal leakage that is caused by the material or also connecting seams (for example, sewn together) does not stand in the way of inflatability of the tent construction.

The frame structure is designed such that, after having been transferred during the inflation process at least partially into its operative state, it can maintain, after termination of the inflation process, the erected state without overpressure in the living space.

FIG. 1 shows at the same time an example of a situation in which the camping vehicle is designed such that the frame structure during inflation can be moved by means of the inflation means at least partially automatically into its operative state. The frame elements 103 are each pivoted automatically, as a function of the inflation process, and by the way also in case of suctioning. This provides the user with additional ease of use. As a further possibility the frame structure could be provided with additional frame elements or devices in order to position or secure manually the aforementioned frame elements 103 additionally in the erected state, for example in that the frame elements are pushed together, rotated about a joint, or snapped into place. It is noted that use of telescoping frame elements is advantageous because they, upon inflation or suctioning, can be automatically extended or retracted. As an additional possibility, also a locking action of an extended state may occur automatically upon extension. In case of the latter, for example, locking elements arranged on the telescoping frame elements can be used with benefit that, for example, under the action of a spring force, will automatically be operative as soon as a predetermined state has been reached. Telescoping frame elements that are provided in order to be activated automatically by inflation and/or suctioning, are preferably designed such that they will extend and/or retract with as little resistance as possible. When the respective automatic locking elements are used also, they operate preferably with a resistance as minimal as possible.

Figure 2:
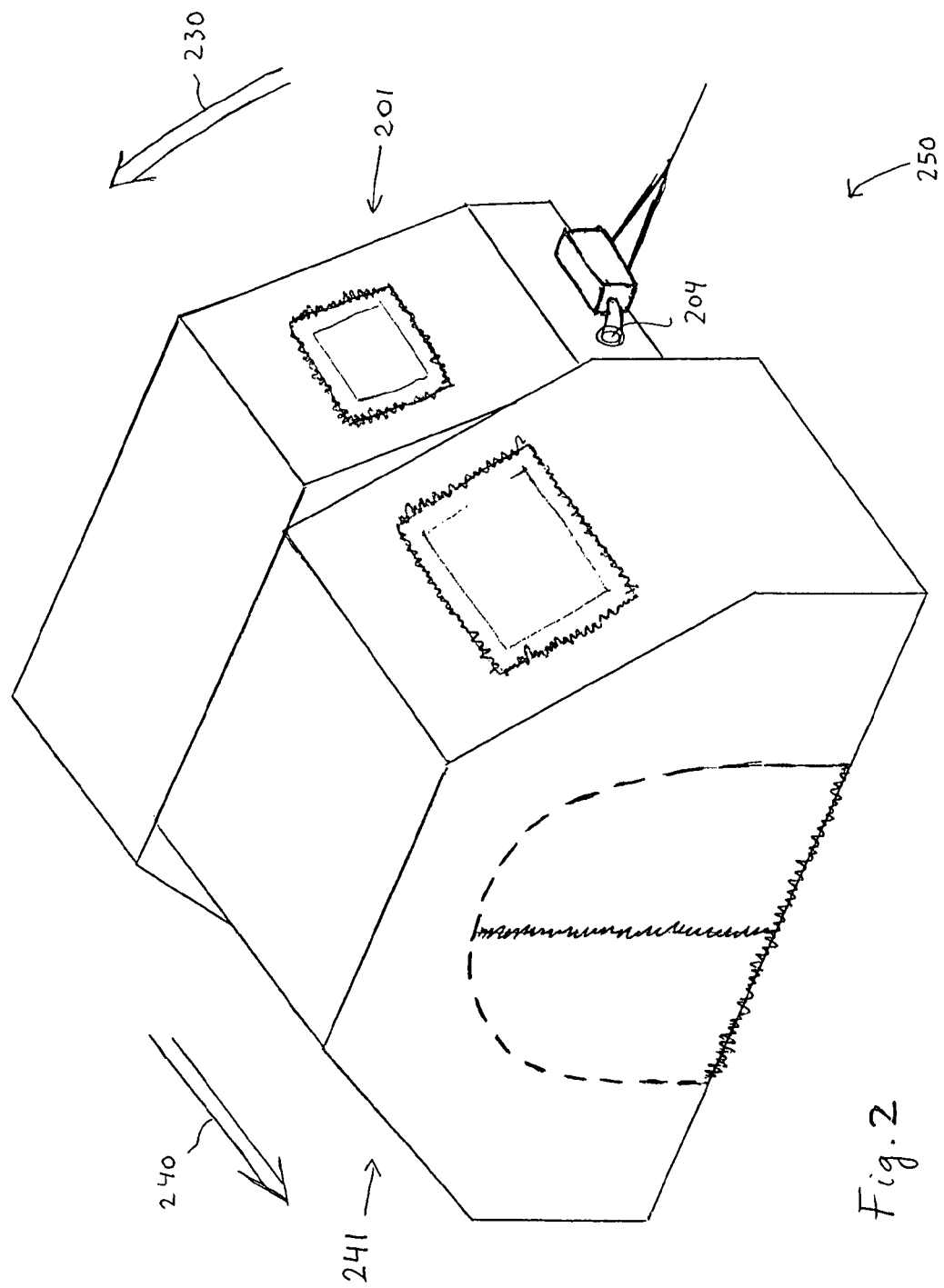
FIG. 2 shows in perspective illustration an example of a configuration of a folding caravan with an awning according to the invention.

Now reference is being had to FIG. 2 that illustrates a folding caravan 250 according to the invention. The folding caravan 250 is provided with a tent construction 201. The folding caravan 250 corresponds to the folding caravan 150 illustrated in FIG. 1 in the sense that the tent construction 201 comprises a fold-out main tent construction that corresponds to the tent construction 101 of the folding caravan 150 of FIG. 1. In the illustrated situation the main tent construction is in the erected state which is achieved in that the main tent construction is folded out in the direction of arrow 230. The inflation connector is indicated by reference numeral 204.

The tent construction 201 comprises at the same time a fold-out tent extension 241 for the main tent construction that is connected to the main tent construction or is connectable thereto, in this case an awning. This awning can also be erected by means of an inflation process and can also be optionally folded down by a suction process. In FIG. 2, reference numeral 240 indicates an arrow that indicates the direction in which the awning 241 is folded out from its stowed-away state when inflated. Folding down is realized in opposite direction. Additional operating comfort is provided when the inflation connector of the tent construction 201 at the same time acts as an inflation connector for the awning 241. For example, the inflation connector of the tent construction 201 can be connected by an air passage with the interior living space of the awning 241 wherein the air stream through the air passage is controlled by means of a controlled or actuatable shut-off valve. For example, by means of actuation or control it can be affected that, beginning with the stowed-away state of the main tent construction as well as of the awning 241, first the main tent construction and subsequently the awning 241 are inflated.

Now reference is being had to FIG. 3 which shows the camping vehicle in the form of an automobile. In the illustrated example the automobile is a motorhome 350 (also referred to as "camper") which is provided with a fold-out tent construction 301. In the stowed-away state the tent construction 301 can be stowed, for example, in a storage cover on the rear, the side or on top of the automobile. In the embodiment, a storage cover 322 is illustrated that is located at the rear of the automobile; the tent construction 301 can be folded out in the direction indicated by arrow 330.

It is noted that the automobile 350 illustrated in the embodiment of FIG. 3 would already be a camping vehicle without the presence of the tent construction 301. Instead, an automobile according to the invention could also be of a type that without the presence of the tent construction would not be a motorhome but, for example, a normal passenger car (also called a "luxury car").

In a camping vehicle according to the invention the inflation means can be matched or adjusted in such a way to the tent construction that, as a reaction to an actuation carried out by the user in order to erect the tent construction from its stowed-away state, the inflation means will deliver a metered quantity of air which is limited for usual ambient pressure to approximately the volume of the interior living space in the erected state. Also, additional ease of use is provided in that a suitable quantity of inflation air is automatically used without, for example, there being the risk that the boundary wall construction is inflated too much and could be damaged. Instead, or additionally, also a pressure relief valve could be used.

The way in which the tent constructions of camping vehicles are automatically erected for folded down according to the invention is different for each model. The level of automation can vary from a somewhat lower level where the user during inflation or suctioning once in a while will carry out simple and easy assisting manipulations, for example, assisting the movements of the frame structure or the tent walls, up to a high level or even completely automatic level where such assisting manipulations are not required or hardly required. In general, in this connection it holds true that, as the level of automation increases, requirements with regard to development become more stringent. In case of a lower, automation level, for example, for the at least one tent wall a tent wall material of polyester or nylon that is laminated with polyurethane, acrylic or PVC can be used or cotton or polyester/cotton fabric of approximately 300 grams for square meter. As a bottom sheet material the materials that are used conventionally in tents can be used. In case of a high automation level, air-impermeable tent wall material of a lower weight is desirable, for example, a polyester fabric of approximately 180 to 230 grams per square meter, laminated with acrylic or polyurethane or a combination of the two. Also, the bottom sheet material is then preferably lightweight and flexible, in particular when the tent construction is relatively large. In a folding caravan that has been tested by the instant applicant for patent, for example, as a canvas and as bottom sheet a fabric of a weight of 180 grams per square meter that is produced of "ripstop" polyester fabric with a polyurethane coating has been found suitable. Primarily in case of a high level of automation it is moreover desired that the camping vehicle is designed such that the at least one inflation opening during suctioning is not plugged by sucked-in tent material.

In a camping vehicle according to the invention, different kinds of inflation means and/or suctioning means can be used. In a folding caravan according to the invention that has been tested by the applicant for patent it has been found that, for example, a product that is commercially available can be used for inflation: type "Air Blower" of Zhongshan Wilson Plastic Industrial C, Ltd. model FJ-25, 250 watts. For suctioning the aforementioned folding caravan it has been found that most conventional household vacuum devices between 800 watts and 1,300 watts are suitable. In case of the instant folding caravan it has been found that a "Black & Decker GW 3000" 3,000 watts is suitable for inflation as well as for suctioning. In principle, also somewhat greater air pumps that are operated by hand or by foot are also suitable.

It is noted that the aforementioned examples of embodiments of the invention are non-limiting and that within the protective range of the attached dependent claims diverse alternatives are possible.

For example, different shapes of tent constructions are possible, for example with different protuberances. Also, various kinds of tent extensions can be used, for example, awnings, rooftop tents and the like. For example, in the folding caravan according to the invention different shapes of tent constructions are possible that during inflation will become erect in such a way that they assume the detailed external shapes of a tractor of the folding caravan. When the solution according to the invention is used in connection with the folding caravan disclosed in NL 1017395, a special ease of use is provided, for example.

Moreover, the interior living space may be divided into partial chambers that are connected to each other. Also, diverse kinds of electrically driven or non-electrically driven inflation means can be used.

Additional user comfort is moreover achieved when the inflation means and/or the suction means are actuatable by means of a (wireless) remote control. In this way, a camper can erect or stow away the tent construction of a folding caravan, for example, from the tractor which is welcome in case of a shower, for example.

Further, diverse connecting mechanisms for the connection between the at least one vehicle wall and the at least one tent wall are possible. The sealing means disclosed in EP 1 243 723 B1 are provided here only as one of the many possibilities of such connecting mechanisms which sealing means comprise at least one airtight, inflatable, tubular body of a flexible material. When such a type of a sealing means is used, there is an option to also inflate or suction the inflatable body in that this body is connected to the inflation means or suction means provided for inflation or suctioning of the boundary wall construction.

When the at least one tent wall comprises stiff wall parts, these parts are preferably manufactured of a lightweight material. For this purpose, for example, a carbon fiber composite construction, sandwich construction, and/or honeycomb construction can be used in these stiff wall parts.

Further variants or modifications are however also possible. It is presumed that the these and similar alternatives are within the gist of the invention as defined in the appended claims.

What is claimed is:

1. A camping vehicle comprising:
   at least one vehicle wall;
   a fold-out tent construction comprising at least one tent wall, wherein the tent construction has a stowed-away state within a storage space provided by the at least one vehicle wall, wherein in the stowed-away state the tent construction is folded down and wherein the tent construction is moveable from the stowed-away state into an erected state in which the tent construction is folded out;
   a frame structure that has an operative state in which the frame structure maintains the folded-out tent construction in the erected state;
   wherein the at least one vehicle wall and the at least one tent wall adjoin each other or are joinable to each other such that, when in an adjoined state, the at least one vehicle wall and the at least one tent wall form together a part of a boundary wall construction that, in the erected state, defines at least one interior living space of the camping vehicle, wherein at least a part of the at least one vehicle wall and at least a part of the at least one tent wall each immediately delimit the at least one interior living space;
   wherein the boundary wall construction has at least one inflation connector and at least one suction connector;
   wherein the boundary wall construction has openings selected from a door, a window and a venting opening;
   wherein the boundary wall construction comprises closure means with which the openings are closable relative to the at least one interior living space;
   wherein the boundary wall construction is configured to be erected automatically by inflation, when the openings are closed, from the stowed-away state of the tent construction by inflation means connectable to the inflation connector into an inflated state that exists temporarily during erection of the tent construction;
   wherein the boundary wall construction is configured to be stowed automatically by suction, when the openings are closed, to transfer the tent construction from the erected state into the stowed-away state by suction means connectable to the suction connector;
   wherein, in the inflated state, the tent construction is folded out at least partially by an overpressure in the interior living space generated by the inflation means;
   wherein the frame structure that, during the inflation process or in the inflated state of the tent construction, has been brought at least partially into the operative state is configured to maintain the erected state of the tent construction after termination of the inflated state without the overpressure existing in the interior living space.

2. The camping vehicle according to claim 1, wherein the frame structure is at least partially automatically moved into the operative state during the inflation process and at least partially automatically returned into the stowed-away state.

3. The camping vehicle according to claim 1, wherein the tent construction comprises a fold-out main tent construction and at least one fold-out tent extension for the main tent construction, wherein the at least one fold-out tent extension is connected or is connectable to the main tent construction.

4. The camping vehicle according to claim 1, further comprising inflation means connectable to the inflation connector and suction means connectable to the suction connector.

5. The camping vehicle according to claim 4, wherein the inflation means are configured such that, in reaction to an actuation carried out by a user in order to erect the tent construction from the stowed-away state, the inflation means deliver a metered quantity of air which at usual ambient pressure is limited approximately to a volume of the interior living space of the tent construction in the erected state.

6. The camping device according to claim 4, wherein the inflation connector and the suction connector are the same.

7. The camping vehicle according to claim 4, wherein the inflation means and the suction means are combined in a single device.

* * * * *